United States Patent
Kurup

(10) Patent No.: US 7,575,320 B1
(45) Date of Patent: Aug. 18, 2009

(54) NOVELTY FRAMELESS EYE WEAR FOR PROMOTING SOCIABILITY

(76) Inventor: Shree K. Kurup, 5130 Connecticut Ave. NW., Apartment #504, Washington, DC (US) 20008-2066

( * ) Notice: Subject to any disclaimer, the term of this patent is extended or adjusted under 35 U.S.C. 154(b) by 159 days.

(21) Appl. No.: 10/665,256

(22) Filed: Sep. 20, 2003

(51) Int. Cl.
*G02C 1/00* (2006.01)

(52) U.S. Cl. .......................................... 351/203; 351/41
(58) Field of Classification Search ................... 351/41, 351/43, 52, 83, 91, 136, 203; 600/558
See application file for complete search history.

(56) References Cited

U.S. PATENT DOCUMENTS

| | | | | |
|---|---|---|---|---|
| 3,758,202 A | * | 9/1973 | Chunga, Sr. | 351/41 |
| 4,122,847 A | * | 10/1978 | Craig | 128/858 |
| 5,016,999 A | * | 5/1991 | Williams | 351/41 |
| 5,381,190 A | * | 1/1995 | Rehse et al. | 351/57 |
| 5,497,211 A | * | 3/1996 | McNulty | 351/52 |
| 5,740,550 A | * | 4/1998 | Yavitz | 2/15 |
| 5,764,338 A | * | 6/1998 | Mack | 351/158 |
| 5,949,514 A | * | 9/1999 | Wargon | 351/41 |
| 6,984,037 B2 | * | 1/2006 | Bleau | 351/83 |

* cited by examiner

*Primary Examiner*—Nini Legesse
(74) *Attorney, Agent, or Firm*—Robert Nathans

(57) ABSTRACT

A double sided adhesive eye patch, bearing a new or old outdated corrective lens, is placed over the eye of the participant on the singles scene such as in nightclubs or while bathing on beaches, and the wearer can thus see clearly, or fairly clearly if an outdated old corrective lens was used. During normal everyday activities, such a patch would have a ridiculous appearance, but when used in socializing environments they become like small carnival masks and attract attention, which is desired for many folks in these environments. Messages can be affixed that can act as conversation pieces to help people meet each other. If desired, two patches can cover both eyes to form a pair of "crazy" spectacles. Unlike conventional eyewear with temples or straps, they are harder to dislodge by accident from the face of the wearer during swimming and dancing, and are cheap and easily replaceable.

11 Claims, 1 Drawing Sheet

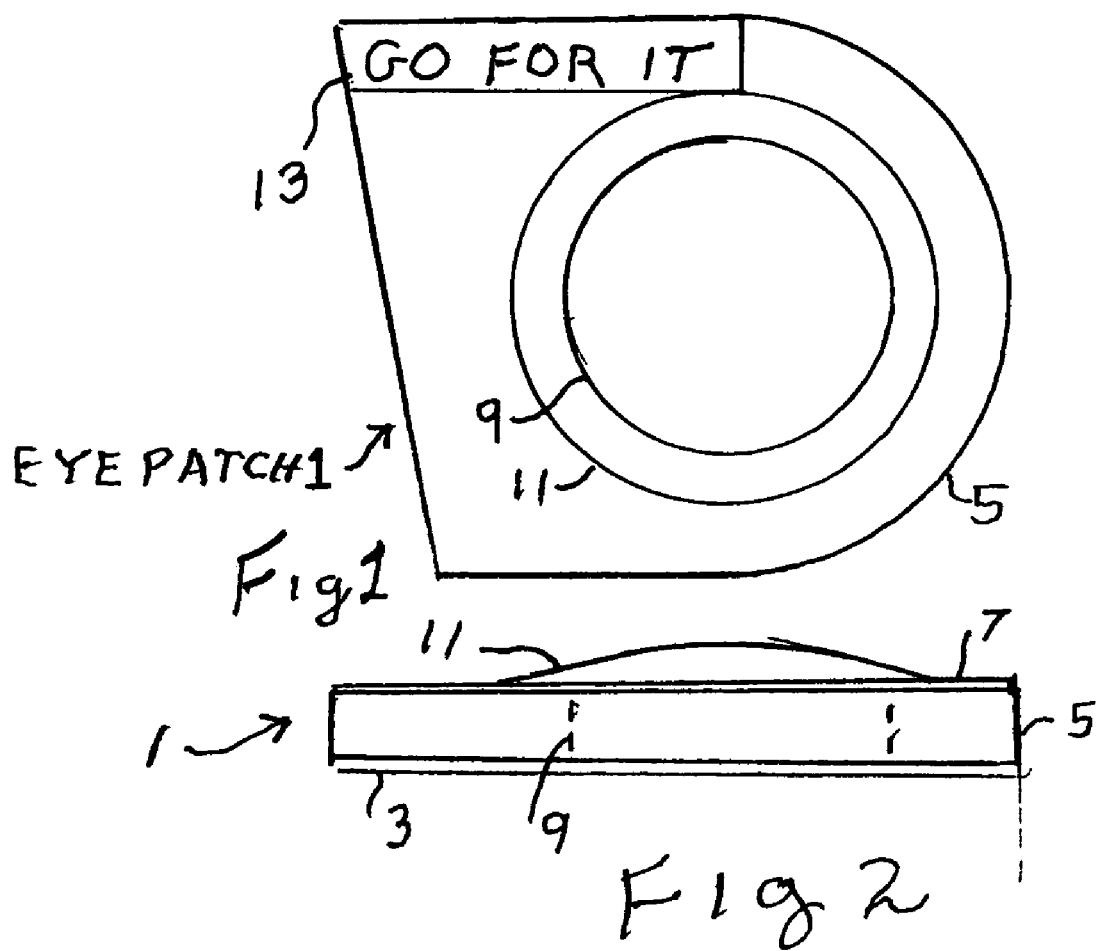

NOVELTY FRAMELESS EYE WEAR FOR PROMOTING SOCIABILITY

BACKGROUND OF THE INVENTION

Socially active people wear conventional eyeglasses during their everyday activities. However, while swimming or splashing about in the ocean or at a lakeside beach or swimming pool, or vigorously dancing at a party or in a nightclub, conventional eyeglasses with temples can become dislodged. Also, many feel that they are physically less attractive while wearing conventional eyeglasses and would prefer to not wear them during these often physically vigorous activities. However, this results in loss of the ability to see clearly in these types of environments, which can be demoralizing, particularly while attending gatherings where there is an opportunity to socially interact with others.

Thus, there is a need to provide inexpensive novelty eyewear that acts as a conversation piece and that also would enable many people, participating in these types of activities, to leave their conventional eyeglasses at home and yet retain the benefits of wearing them. In addition, after a prescription change, the "old" corrective lenses are discarded, which could otherwise be put to good use. While U.S. Pat. No. 5,764,338 to Mack discloses a message attached to eyewear for enhancing social interaction, the message is adhesively attached to conventional eyeglasses having temples that can fall off the wearer's face.

SUMMARY OF EMBODIMENTS OF THE INVENTION

In accordance with preferred embodiments of the invention, a frameless eye patch, bearing a new or old corrective lens, could be placed over the eye of the participant in the aforesaid types of activities, and the wearer could thus see clearly, or fairly clearly if the "old" corrective lens was used, rather than discarded. The patch has a double sided adhesive, overlapping edge portions of the lens, so that the outer adhesive bearing side of the patch would hold the lens upon the patch and the inner adhesive bearing side would contact the face of the wearer to hold the patch upon his or her face.

During normal everyday activities, such a patch would have an unusual, probably unacceptable appearance, but when used in socializing environments like partying or bathing environments, they become like small carnival masks and attract attention, which is desired for many folks in these environments. Thus, they can act as conversation pieces to help people meet each other. They also are very inexpensive as they can be provided in kits of varying size patches made from thick flexible paper or plastic sheets while optionally, making use of "old" otherwise discarded lenses. They can even be enhanced as conversation pieces by having the wearer print their name, or humorous, "crazy" or provocative messages upon the paper or plastic sheets either by using a pen or by attaching a PC produced label upon the outer peripheral surfaces of the patch. If desired, two patches can cover both eyes to form a pair of "crazy" spectacles. Unlike conventional eyeglasses having frames and temples, they are harder to dislodge by accident from the face of the wearer during swimming and dancing, and are cheap and easily replaceable.

BRIEF DESCRIPTION OF THE DRAWINGS

Other features of the invention will become more apparent upon reading the following detailed description, taken in conjunction with the drawings in which:

FIG. 1 shows a front view of the novelty eye patch;
FIG. 2 shows a top view of the eye patch;

DETAILED DESCRIPTION OF PREFERRED EMBODIMENTS OF THE INVENTION

A double sided adhesive single piece eyeglass patch or lens support segment 1, is used as a novelty device whereby the inside adhesive area 3 adheres the flexible, one piece, paper, cardboard or thin plastic eyeglass patch or optical element support segment sheet 5 to the wearer's face (no temples or straps needed) and the outside adhesive layer 7, surrounds a viewing aperture 9, that can support an optical element, preferably a lens 11, that could be an "old" lens made from an outdated prescription change that would otherwise be thrown away. This product is thus a simple inexpensive substitute for a regular pair of eyeglasses that can be more readily knocked off of the face of bathers by ocean waves and can facilitate diving or splashing in pools. Temples or straps are not needed. The old lens 11 is still good enough for a far-sighted bather, splashing in the ocean or dancing, to see with. The eye patch could also bear comic sayings or flirtatious conversation piece messages 13 printed by longhand or preferably by a home PC on a strip of paper in turn affixed to an upper portion of outer adhesive surface layer 7. One can easily create customized message labels with a $79 title printer such as a Casio CD-R. "Hi I'm Alice" could be positioned at 13, or any message such as "Go For It" as shown. This feature could be attractive to youngsters who play on the beach, or party in nightclubs, and socialize with members of the opposite sex. Also, females especially, may not wish to wear conventional eyeglasses while dancing in nightclubs and other flirtatious messages may be adhered to the frames to act as conversation pieces. Thus, the invention can make an attractive, attention getting fad novelty item and could be brightly colored to attract attention. This is in contrast to conventional eyeglasses that many people don't like to wear. Thus a simple, inexpensive novelty item is provided that can use old lenses that are otherwise discarded after prescription change. Since the eye patch has no straps or temples for mounting upon the head of the wearer, it is strapless and templeless providing extreme simplicity.

The worker in the art will appreciate that a low tack adhesive would be employed to facilitate easy attachment and removal of the patch from the wearer's face. See for example, 3M product #9415 mentioned in U.S. Pat. No. 5,381,190 to Rehese et al. As eyeglass fashions change, the shape of the viewing aperture 9 would be changed to accommodate the changing shapes of the lenses. For example, in 2003, flattened oval shaped lenses are popular which would call for similarly shaped viewing apertures. The patches could be brightly colored to attract attention to this eyewear item that would probably be somewhat ridiculous in everyday environments such as the workplace.

The terms of the following claims are intended to cover variations in the aforesaid embodiments that could occur to the workers in the art, and thus the invention is to be limited solely to the terms of the following claims or equivalents thereof.

What is claimed is:

1. A method for aiding a person seeking to attract attention at socially interactive events who may be self-conscious about wearing conventional eyeglasses comprising the steps of:

(a) providing a person seeking to attract attention at socially interactive events with a flexible frameless eye patch with an aperture therein sufficient to enable said person to see through the aperture, and with a first adhesive layer on a first side of said flexible frameless eye patch for affixing said flexible frameless eye patch directly upon said person's face to maintain said eye patch in place during vigorous social activity and having a second adhesive layer on a second side of said flexible frameless eye patch adjacent said aperture for supporting an optical element upon said flexible frameless eye patch and over said aperture;

(b) placing an attention getting message of a type that invites social interaction and that is not a trademark or logo upon said second adhesive layer of said flexible frameless eye patch; and (c) mounting an optical element over said aperture and upon said second adhesive layer on the second side of said flexible frameless eye patch.

2. The method of claim 1 wherein the attention getting message is a comic saying or flirtatious conversation piece message.

3. The method of claim 2 wherein said optical element is an old discarded corrective eyeglass lens belonging to said person, for creating a new use of said old discarded corrective eyeglass lens.

4. The method of claim 3 wherein step (b) is performed by attaching a label bearing said message upon said second side of said flexible frameless eye patch.

5. The method of claim 2 wherein step (b) is performed by attaching a label bearing said message upon said second side of said flexible frameless eye patch.

6. The method of claim 1 wherein said optical element is an old discarded corrective eyeglass lens belonging to said person, for creating a new use of said old discarded corrective eyeglass lens.

7. The method of claim 6 wherein step (b) is performed by attaching a label bearing said message upon said second side of said flexible frameless eye patch.

8. The method of claim 1 wherein step (b) is performed by attaching a label bearing said message upon said second side of said flexible frameless eye patch.

9. A method for aiding a person seeking to attract attention at socially interactive events who may be self-conscious about wearing conventional eyeglasses comprising:

(a) providing a person seeking to attract attention at said socially interactive events with a flexible frameless eye patch having an attention getting device thereon and having an aperture therein sufficient to enable said person to see through the aperture, and with a first adhesive layer on a first side of said flexible frameless eye patch for affixing said flexible frameless eye patch directly upon said person's face to maintain said eye patch in place during vigorous social activity and having a second adhesive layer upon a second side of said flexible frameless eye patch adjacent said aperture for supporting an optical element upon said flexible frameless eye patch; and (b) mounting an old discarded corrective eyeglass lens belonging to said person upon said second adhesive layer and over said aperture, for creating a new use of said old discarded corrective eyeglass lens.

10. A method for aiding a person seeking to attract attention at socially interactive events who may be self-conscious about wearing conventional eyeglasses comprising:

(a) providing a person seeking to attract attention at socially interactive events with a frameless eye patch having a first and second side with an aperture therein sufficient to enable said person to see through the aperture, and with a first fastening device for affixing the first side of said frameless eye patch directly to said person's face to maintain said eye patch in place during vigorous social activity and having a second fastening device for supporting an optical element upon said frameless eye patch;

(b) placing an attention getting message of a type that invites social interaction and that is not a trademark or logo upon the second side of said eye patch; and (c) mounting an optical element over said aperture and upon the second side of said eye patch, wherein said optical element is an old discarded corrective eyeglass lens belonging to said person for creating a new use of said old discarded corrective eyeglass lens.

11. The method of claim 10 wherein said second fastening device constitutes an adhesive layer.

* * * * *